United States Patent Office 3,081,152
Patented Mar. 12, 1963

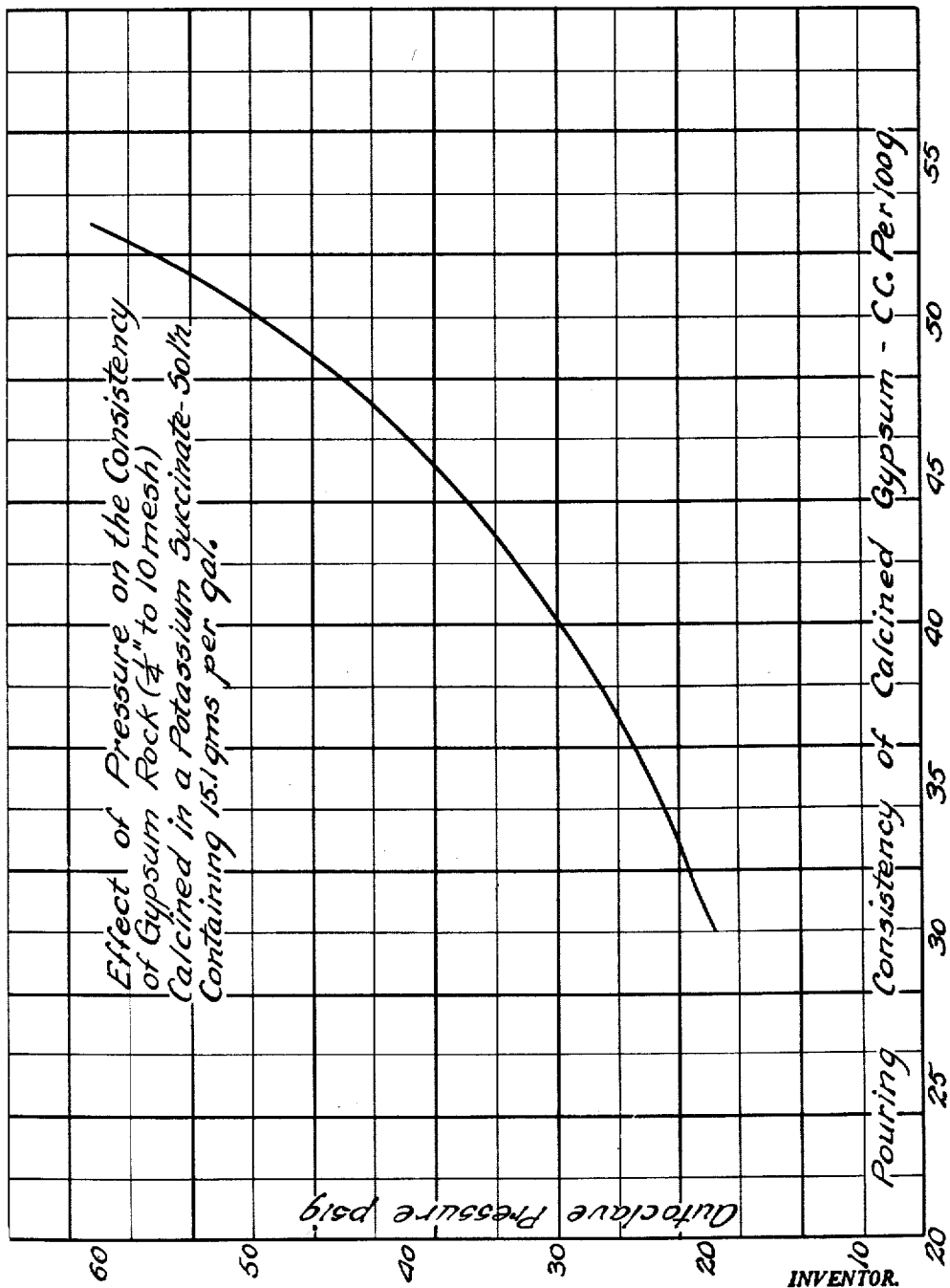

3,081,152
PROCESS FOR CALCINATION OF GYPSUM
Elmer S. Johnson, Arlington Heights, Ill., assignor to United States Gypsum Company, Chicago, Ill., a corporation of Illinois
Filed Oct. 5, 1959, Ser. No. 844,416
8 Claims. (Cl. 23—122)

This invention relates to an improved process for calcining gypsum and more particularly pertains to the formation of low consistency calcium sulfate hemihydrate in a minimum amount of time.

Ordinarily calcined gypsum, known under various names, such as stucco, plaster of Paris, molding plaster, and the like, consists primarily of the hemihydrate of calcium sulfate, $CaSO_4 \cdot \frac{1}{2}H_2O$. This material is capable of being reconverted into calcium sulfate dihydrate by mixing it with an excess of water. The hemihydrate will combine with sufficient water to reform the dihydrate thereby forming a super-saturated solution thereof which is crystallized out in the form of long slim interlaced gypsum crystals, forming what is known as a set gypsum mass. Gypsum calcined in the usual manner, such as in a kettle or a rotary calciner, comprises conglomerates of very fine crystals resulting from escaping water of hydration causing shattering of the individual gypsum crystals into extremely fine particles. These conglomerates are porous and take up a large quantity of water which forms voids upon evaporation and thus greatly impair the strength of products formed therefrom.

If, on the other hand, the calcined gypsum, particularly the hemihydrate, could be produced in the form of short squat and almost cubical crystals having smooth surfaces and thus a much lower surface area, it will be self-evident that such a material would inherently require a great deal less water to wet the surface of the individual crystal particles thereof to convert it into a pourable slurry.

It has become the custom in the gypsum industry to describe the amount of water, expressed in cubic centimeters or grams, required to be added to 100 grams of calcined gypsum to produce a slurry which will just barely pour from a cup, as the consistency of the plaster, this usually being expressed by merely a number, it being understood, however, that the number means cubic centimeters or grams of water per 100 grams of product.

For many years various additives had been admixed with ordinary calcined gypsum for the purpose of producing a lower consistency than that which is characteristic of most kettle-calcined gypsum products. Such ordinary kettle-calcined gypsums ordinarily have a consistency of around 65 to 72 and a corresponding low strength in the finished dried set article.

The first commercially successful means of obtaining a calcined gypsum having smooth, short, squat crystals and thus a lower consistency than that obtained by the usual methods, and therefore a correspondingly high strength, was the process of Randel and Dailey, which was covered by United States Patent No. 1,901,051. This Randel and Dailey method involved the heating of lumps of raw gypsum rock under steam pressure at about from 15 to 17 pounds per square inch gauge for about six hours, whereafter the resulting lumps were dried without cooling and then ground. It was necessary to dry them at a high temperature to avoid their reconversion into the dihydrate. By using such a method a product was obtained which would have a consistency of about 40 to 44 per 100 grams of the calcined gypsum. Such material is known as alpha gypsum. Using exactly the same raw materials, but calcining under atmospheric conditions in the manner ordinarily used, such as in kettle calciners or rotary calciners, a product having a consistency of about 70 would be obtained.

In accordance with the teaching in Patent No. 2,913,308, it has been found that alpha gypsum, having a consistency as low as 27, and possibly even somewhat lower, may be obtained by subjecting gypsum between $\frac{1}{2}"$ and 20 mesh particle size, and without agitation, to heat under pressure while submerged for a definite period of time in an aqueous solution of a dicarboxylic organic acid compound, such as succinic acid and its soluble salts. The latter acid and salts thereof comprise some of the better known crystal-habit-modifiers which if present during the autoclaving of gypsum result in a squatter crystal of hemihydrate. The more cubical the hemihydrate the less water needed and the lower the consistency.

It was also found that, after the gypsum had been cooked in the solution containing a crystal-habit-modifier for a certain length of time, the solution could be withdrawn from the particulate partly converted gypsum and the calcination continued under steam pressure at from 15 to 35 pounds per square inch gauge pressure until the desired short squat gypsum crystals were obtained.

As a further improvement of the "solution" method of calcining gypsum in which gypsum particles are immersed in a crystal-habit-modifier solution, the disclosure in Patent No. 2,907,668 taught that the gypsum rock particles need not be immersed in a crystal-habit-modifier solution during calcination in order to obtain a low consistency calcined gypsum, i.e., alpha gypsum. It has been found that the maintaining of the gypsum particles in a wet condition, such as may be effected by percolation of the crystal-habit-modifier solution over the gypsum particles, is sufficient.

It was also disclosed in Patent No. 2,907,668, that the pressure utilized in the calcination operation can be progressively increased whereby the total calcination time is shortened but the quality of the final product remains unaltered.

In accordance with the teaching in Patent No. 2,907,667, it is now known that when the surface of lump gypsum having a particle size coarser than that which will pass through a 16 mesh screen is treated with a solution of a crystal-habit-modifier such as potassium succinate, the thus treated lumps can be calcined with steam alone under pressure to form low consistency calcined gypsum without the necessity of stirring or immersion in a solution. The resulting plaster when ground will have substantially the same properties as that obtained by the solution method.

It was also taught in Patent No. 2,907,667 that the calcination time may be markedly decreased without any subsequent increase in the consistency of the finished plaster if the calcination of gypsum particles coated with a crystal-habit-modifier is carried out at the usual low calcining pressure for a certain length of time. The calcining pressure may then be progressively increased and calcination completed in a lesser period of time.

In accordance with this invention it has been found that production of low consistency calcined gypsum may be effected in calcination methods employing calcining steam atmospheres in extremely short time periods.

It is an object of this invention, therefore, to provide a novel process for producing low consistency calcined gypsum which requires a minimum of processing time.

It is another object of this invention to provide a novel process for the production of low-consistency gypsum which utilizes crystal-habit-modifiers. The novel steps may be incorporated in presently practiced calcining operations employing crystal-habit-modifiers regardless of the method of application of the crystal-habit-modifier to the gypsum particle surface.

It is a further object of this invention to provide an improved process for calcining gypsum which requires no processing apparatus in addition to that commonly employed for calcination.

In addition to those calcining processes utilizing crystal-habit-modifiers the improved process hereinafter disclosed is also adaptable for use in steam calcination utilizing no crystal-habit-modifier such as is disclosed in United States Randel and Dailey Patent 1,901,501.

The above and other objects of this invention will become more apparent upon proceeding with the following detailed discussion when read in the light of the appended claims and accompanying drawing.

In one embodiment of the process hereinafter disclosed gypsum rock having a particle size between ¼ inch and 10 mesh was heated in a crystal-habit-modifier solution containing 15.1 grams of potassim succinate per gallon. The rock and solution were heated for .5 hour in a saturated steam atmosphere of 20 p.s.i.g., after which the gypsum was heated for 3.5 hours in a saturated steam atmosphere of 30 p.s.i.g. Hence, after a total calcination time of only 4 hours calcination was completed and the calcium sulfate hemihydrate product resulting from such gypsum rock had a consistency of 32. Normally, in the solution method of forming calcined gypsum the saturated steam atmosphere is maintained at 20 p.s.i.g. for approximately 8 hours, all other process conditions being the same as above set forth, after which a calcined gypsum product having a consistency of about 30 is made therefrom. Thus by using increasing pressures the processing time may be cut in half with only a slight increase in consistency.

Similar reductions in calcining time may be obtained in the "percolation" method of wetting the gypsum rock with crystal-habit-modifier. This latter method is set forth in Patent No. 2,907,668. Startling savings in calcintime are also obtained by incremental pressure increases in the "soaking" method of wetting gypsum rock as set forth in Patent No. 2,907,667.

The attached drawing comprising a graph representing the relationship between consistency of calcined gypsum and autoclaving pressure will assist in understanding the disclosure hereinafter made.

In the calcination of gypsum in a solution of a crystal-habit-modifier under steam pressure, it has always been considered necessary to calcine at a relatively low pressure. Calcinations have been carried out at about 20 p.s.i.g. for an extended length of time such as for about 8 hours in order to form a plaster of relatively low consistency, i.e., of 27 cc. to about 36 cc. In general, the lower the pressure the lower the consistency, however longer periods of time are required to produce the lower consistencies at the lower pressures. It has been discovered that it is not necessary to hold the pressure at this lower value for the full extent of the calcination. A low pressure need be maintained for only a certain percentage of the entire calcination time, whereupon the pressure may be markedly increased without a significant increase in consistency in the final alpha gypsum product.

It has further been discovered that the time interval between the start of calcination and the pressure increase can be much shorter than that previously thought possible. The total time required to effect the calcination of a low consistency product varies and is a function of the source and size of gypsum rock, the concentration and type of crystal-habit-modifier used, the system of steam calcination followed, the pressure, the size of equipment used, the rate at which the required pressure is reached within the vessel, as well as other factors. The consistency is also controlled by the above factors. There are a few gypsum rocks which are difficult to calcine into low consistency products. It is intended in the description of this invention to use a normal basis of comparison the total time required to calcine gypsum rock at the lower pressure, usually 20 p.s.i.g., and consider it to be 100% or 100 units. This will be subsequently referred to as the normal calcination time. Hence, in referring to the initial low pressure calcination time after which pressure can be increased, it will be in percent of this total time rather than in hours or fractions thereof. This renders it unnecessary to qualify each statement for example as to rock size, equipment size, etc., when stating how soon the pressure can be increased. A normal calcination time can obviously be determined for each specific combination of conditions.

As stated previously, it has been discovered that the minimum process time expended in the lower pressure range may be surprisingly short. It may be as short as about 1.0% of the normal calcination time, but it is usually higher. The pressure may then be increased to as high as about 60 p.s.i.g., or higher if the rate of increase is not exceedingly fast. It is possible to reduce the calcination time in a process employing a crystal-habit-modifier to as low as about 10% of that required for calcination at the former lower constant pressure condition and still have a calcined gypsum of low consistency.

The consistency of the final calcined gypsum product is a function of the rate of calcining pressure increase as well as the maximum pressure reached. In general, however, the higher the pressure the shorter the calcination time, as will be noted from subjoined Table I.

It is apparent from the curve in the drawing and the data in Table I that the consistency in a direct function of the pressure employed, all other factors being equal. Table I illustrates the effect of pressure upon the consistency of $-¼''$ to $+10$ mesh gypsum rock calcined in a solution of potassium succinate in a concentration of 15.1 grams per gallon. In preparing this curve the time required to calcine gypsum at 20 p.s.i.g., i.e. 8 hours, is used as a datum and the time required at the various other pressures is expressed as a percentage of the time needed to calcine at this preferred pressure. It will be noted that when the initial pressures are higher the pouring consistency is also higher. For example, only a 10 p.s.i.g. increase in pressure (in excess of 20 p.s.i.g.) increased the consistency to about 40 cc. or about 10 cc.

TABLE I

*The Effect of Calcining in a Solution of Potassium Succinate at Constant Pressures*

| Rock Size | Pressure, p.s.i.g. | Total calcination time, hrs. | Percent of that required for 20 p.s.i.g.[1] | Consistency, cc./100 gms. | Combined $H_2O$, percent |
|---|---|---|---|---|---|
| ½'' to 10 m | 18 | 7.00 | 87.8 | 34 | 9.90 |
| Do | 20 | 6.00 | 75.00 | 36 | 6.11 |
| Do | 20 | 7.00 | 87.8 | 34 | 6.23 |
| Do | 20 | 7.00 | 87.8 | 35 | 6.12 |
| Do | 20 | 6.00 | 75.0 | 34 | 6.23 |
| Do | 20 | 7.00 | 87.8 | 35 | |
| Do | [2] 20 | 7.50 | 93.0 | 43 | 5.75 |
| Do | 20 | 7.50 | 93.0 | 34 | 6.24 |
| Do | 20 | 6.50 | 81.5 | 32.5 | 6.65 |
| ½'' to ⅜'' | 20 | 7.83 | 98.0 | 34.0 | 5.95 |
| ⅜'' to ¼'' | 20 | 7.83 | 98.0 | 32.0 | 6.20 |
| ¼'' to 10 m | 20 | 7.83 | 98.0 | 30.5 | 6.24 |
| ½'' to 10 m | 20 | 8.00 | 100.0 | 34.5 | 6.09 |
| Do | 30 | 2.08 | 26.1 | 44 | 6.31 |
| Do | 30 | 2.50 | 31.4 | 40 | 6.19 |
| Do | 30 | 2.33 | 29.20 | 40 | 6.23 |
| Do | 40 | 1.25 | 15.7 | 51 | 6.18 |
| Do | 40 | 1.25 | 15.7 | 50 | 6.13 |
| Do | 40 | 0.75 | 9.4 | 43 | 6.12 |
| Do | 40 | 0.50 | 6.25 | 54 | 6.31 |
| Do | 40 | 0.63 | 7.90 | 42 | 6.35 |
| Do | 40 | 0.75 | 9.4 | 48 | 4.45 |

[1] Based upon 8 hours total calcination time.
[2] 2–8 gms. of succinic acid used per gallon. All others were 9.29 gms. per gallon of solution. The solutions were neutralized with KOH to form potassium succinate.

Is is possible to calcine at these higher pressures and hence decrease the time very substantially without an excessive increase in consistency if the initial calcination pressure is low for a relatively short length of time and the pressure then increased. The increase in pressure, however, must not be at too fast a rate.

Subjoined Table II comprises a tabulation of gypsum calcinations carried out stepwise with increasing pressures to produce low consistency calcium sulfate hemihydrate in less time than heretofore believed necessary. In these examples, the following process procedures were followed unless otherwise indicated:

Gypsum rock such as mined in the vicinity of Southard, Oklahoma, is crushed to a size as indicated in the table and immersed in a vessel containing a hot solution of potassium succinate in hot water in a concentration of 15 grams per gallon. The container is then placed within an autoclave. Steam is introduced and the pressure is quickly built up therein to the desired minimum value, such for example as 20 p.s.i.g. The steam is maintained at this pressure for the required percentage of normal calcination time whereupon the pressure is increased to the intended maximum value and if desired maintained until the calcination has been completed. It sometimes has been found desirable to increase the pressure in increments before the calcination is complete, though in certain commercial operations it can be made to follow a constantly increasing pressure versus time curve.

At the termination of calcination, the solution is drawn off, the calcined rock which still maintains its original shape, though a close examination will reveal that the crystal structure has been altered, is removed from the autoclave and dried under conditions, well known in the art, to prevent rehydration.

After drying, the rock is ground to form a plaster which will have a consistency preferably under about 36 cc., usually between 30 to 32 cc. However, if a more plastic plaster is wanted the powder can be ball or tube milled, whereupon the consistency may increase to about 38 cc. In all cases, it is preferred to hold the surface area to a minimum and avoid over-grinding. Only sufficient grinding should be done to give the desired plasticity. A balance between consistency, Blaine coefficient and plasticity should be reached.

TABLE II

*Calcination in a Solution of Potassium Succinate at an Initially Low Pressure Followed by an Increase to a Higher Pressure*

| Time, hrs. at pressure, p.s.i.g. | Total cal. time, hours | Consistency, cc./100 gms. | Combined H₂O, percent |
|---|---|---|---|
| .50 hr at 18, .50 at 25, .50 at 40 | 1.50 | 33.5 | 7.27 |
| .50 hr. at 18, .25 at 25, .75 at 40 | 1.50 | 34.0 | 6.10 |
| .125 hr. at 18, .50 at 30, .75 at 40 | 1.375 | 36.0 | 6.10 |
| .25 hr. at 18, .25 at 30, .75 at 40 | 1.25 | 35.0 | 6.28 |
| .5 hr. at 20, 3.5 at 30 | 4.00 | 32.0 | 6.14 |
| .5 hr. at 20, 3.5 at 30, 0.5% Nacconal Z¹ | 4.00 | 32.0 | 6.12 |
| Do¹ | 4.00 | 38.0 | 6.07 |
| .5 hr. at 20, 3.5 at 30 | 4.00 | 33.0 | 6.18 |
| Do | 4.00 | 32.0 | 6.17 |
| .5 hr. at 20, 3.5 at 30, 5.2 gms. succinic acid, per gal (not neutralized) | 4.00 | 33.5 | 6.12 |
| .5 hr. at 20, 3.5 at 30 | 4.00 | 33.0 | 6.04 |
| .25 hr. at 20, 3.50 at 30 | 3.75 | 33.0 | 6.12 |
| .25 hr. at 20, 3.50 at 30, 7.2 gms. succinic acid per gal | 3.75 | 34.0 | 6.06 |
| .25 hr. at 20, .5 at 30, .75 at 40 | 1.50 | 34.0 | 6.17 |
| .25 hr. at 20, .25 at 30, .50 at 40 | 1.00 | 35.5 | 7.57 |
| .125 hr. at 20, .50 at 30, .75 at 40 | 1.375 | 34.0 | 6.12 |
| .125 hr. at 20, .375 at 30, .625 at 40 | 1.125 | 35.5 | 6.37 |
| .125 hr. at 20, .50 at 30, .75 at 40 | 1.375 | 36 | 6.01 |
| .125 hr. at 20, .50 at 30, .375 at 50 | 1.00 | 36.0 | 6.19 |
| .375 hr. at 20, .375 at 30, .375 at 50 | 1.125 | 36.0 | 6.18 |
| .50 hr. at 20, .25 at 30, .50 at 50 | 1.25 | 36.0 | 6.33 |
| .25 hr. at 20, 2.55 at 31 | 2.80 | 36.0 | 6.02 |
| .50 hr. at 20, 3.55 at 30 | 4.00 | 35.5 | 5.93 |
| .5 hr. at 20, 1.5 at 40 | 2.00 | 35.0 | 6.01 |
| .5 hr. at 20, 1.0 at 40 | 1.50 | 37.0 | 6.04 |
| .625 hr. at 20, 1.00 at 40 | 1.625 | 36.0 | 5.90 |
| .80 hr. at 20, .56 at 43 | 1.36 | 36.0 | 7.13 |
| .8 hr. at 20, .7 at 43 | 1.50 | 36.0 | 6.14 |

¹ Wetting agent.
NOTE.—Unless otherwise indicated all calcinations were made in a solution containing 9.2 gms. of succinic acid per gallon and neutralized with KOH which is 15.1 gms. of potassium succinate per gallon. Gypsum rock size was ¼″–10 M.

In order to illustrate the manner by which the calcining process herein disclosed may be carried out in a minimum of time, the following calcinations were carried out. These calcinations employed an initially low calcining pressure for a very short period of time, after which the pressure was continuously increased at a fixed rate. The data herein tabulated in Table III was obtained from calcinations in which gypsum rock −3 mesh−+10 mesh obtained from Southard was calcined by the solution method in which potassium succinate was employed as a crystal-habit-modifier in a concentration of 15.1 grams per gallon.

TABLE III

*Calcination at Increasing Pressure to Effect Fast Calcination*

| Time (percent of normal cal. time): | Pressures, p.s.i.g. | | | | | |
|---|---|---|---|---|---|---|
| | Run 58 | Run 59 | Run 60 | Run 64 | Run 65 | Run 66 |
| 0 | 0 | 20.0 | 20 | 20 | 20 | 20.0 |
| .5 | 5.6 | 20.6 | 24.7 | 23.5 | 27.2 | 20.1 |
| 1.0 | 15.0 | 20.2 | 30.5 | 25.2 | 30.2 | 20.8 |
| 1.5 | 23.8 | 23.2 | 33.0 | 26.7 | 32.4 | 22.2 |
| 2.0 | 24.9 | 24.1 | 34.7 | 28.9 | 34.7 | 24.0 |
| 2.5 | 27.0 | 26.0 | 36.5 | 30.0 | 36.5 | 26.0 |
| 3.0 | 29.3 | 28.7 | 38.5 | 32.5 | 38.3 | 28.3 |
| 3.5 | 32.2 | 31.2 | 39.9 | 33.4 | 40.3 | 30.1 |
| 4.0 | 34.1 | 33.6 | 42.2 | 36.2 | 41.3 | 32.2 |
| 4.5 | 37.2 | 35.4 | 43.3 | 37.8 | 44.2 | 34.1 |
| 5.0 | 38.5 | 38.0 | 43.9 | 40.0 | 44.8 | 36.0 |
| 5.5 | 39.8 | 40.9 | 46.2 | 42.2 | 45.6 | 37.9 |
| 6.0 | 42.0 | 42.6 | 46.6 | 43.9 | 47.0 | 39.9 |
| 6.5 | 44.7 | 44.1 | 48.4 | 45.3 | 48.0 | 41.8 |
| 7.0 | 48.3 | 46.6 | 50.0 | 46.6 | 50.1 | 44.0 |
| 7.5 | 49.5 | 49.5 | 51.8 | 50.0 | 51.8 | 46.0 |
| 8.0 | 51.4 | 50.5 | 52.1 | 52.9 | 52.2 | 47.0 |
| 8.5 | 53.6 | 53.8 | 53.5 | 53.9 | 53.4 | 49.9 |
| 9.0 | 56.2 | 56.2 | 54.3 | 56.5 | 54.1 | 51.4 |
| 9.5 | 58.2 | 58.3 | 55.9 | 57.9 | 55.6 | 54.2 |
| 10.0 | 60.2 | 60.0 | 56.0 | 60.8 | 56.1 | 55.6 |
| 10.5 | | | | 61.7 | 56.8 | 58.0 |
| 11.0 | | | | 64.6 | 57.5 | 60.1 |
| Time to reach starting pressure, min. | 0 | 6 | 6 | 5 | 6 | 5¾ |
| Time, end of run to opening of autoclave, sec. | 45 | 90 | 90 | 105 | 92 | 87 |
| Average pressure increase per percent N.C.T. (p.s.i.g.) | 6.0 | 4.4 | 3.6 | 4.5 | 3.7 | 4.0 |
| Percent comb. moisture | 6.66 | 6.56 | 6.26 | 6.22 | 6.17 | 6.55 |
| Consistency, cc. | 37 | 37 | 37.5 | 37.5 | 37.5 | 37.5 |

It will be noted from Table III that the pressure in the calcining vessel may be increased as rapidly as 6 p.s.i.g. per percent of normal calcination time for obtaining an alpha gypsum product having a consistency of about 37. Obviously, any slower rate should provide an even lower consistency.

The above calcinations were made upon an electrically heated autoclave in which water was added before starting and control of the steam pressure was obtained by a variation in the electrical input. Additional calcinations were made upon the same apparatus following a stepwise increase in pressure. The results obtained were as follows:

| Run No. | Percent N.C.T.¹ at pressure (p.s.i.g.) shown | | | | Total time, percent N.C.T. | Consistency, cc./100 gms. | Combined H₂O, percent |
|---|---|---|---|---|---|---|---|
| | 20 | 30 | 40 | 50 | | | |
| 54 | 3.1 | 3.1 | | 6.2 | 12.5 | 35.5 | 6.22 |
| 55 | 3.1 | 3.1 | 6.2 | | 12.5 | 35.5 | 7.03 |
| 57 | 1.6 | 6.2 | | 4.7 | 12.5 | 35.0 | 6.25 |

A time of about 1.5% N.C.T. was required to bring the pressure of the vessel up to 20 p.s.i.g. after closing, about 1.0% was required from 20 to 30 p.s.i.g., about .8% from 30 to 40, and about 1.5% from 30 to 50 p.s.i.g.

The data for Tables I, II, and III, above, were prepared from calcinations in which the gypsum particles were immersed in a solution containing a crystal-habit-modifier. However, the process of calcining at increasing steam pressures is readily adaptable for use in those calcining procedures in which the crystal-habit-modifier solution is merely coated on the gypsum particles or percolated through the particles.

It has been found that the percolation method of calcining gypsum as set forth in Patent No. 2,907,668 functions substantially the same as the solution method when increasing calcining pressures are employed. Similarly to the solution method, the normal calcination time for gypsum utilizing the percolation method is 8 hours at a saturated steam pressure of 20 p.s.i.g.

The following calcination examples are illustrative of the reduced processing times which are adequate in carrying out the percolation method of calcining utilizing increasing pressures in the autoclave.

normal calcination time of 8 hours for the other two processes at a constant pressure of 20 p.s.i.g.

However, the calcination time may be materially reduced in the gypsum coating method by calcining at a reduced pressure for a short period of time and then increasing the pressure. The total calcination time will be much shorter than the 16 hours required at the constant saturated steam pressure of about 18 p.s.i.g. in calcining gypsum and forming a low consistency alpha gypsum.

As was set forth in Patent No. 2,907,667, the pressure in an autoclave containing gypsum lumps coated with a crystal-habit-modifier may be held at 18 p.s.i.g. for 5 hours. At the end of this time the steam pressure may be increased to 20 pounds for 2 hours, and then to 30 pounds for 2 hours. Gypsum lumps of ½ to 1½ inch size at the termination of the above processing will be completely calcined.

TABLE IV

*Calcination by Percolation of Solution Over Gypsum Rock in an Atmosphere of Steam*

| Hours at pressure (p.s.i.g.) of— | | | | | Initial | | | Pump rate, g.p.m. | Consist., cc. | Combined H₂O, percent |
|---|---|---|---|---|---|---|---|---|---|---|
| 18 | 20 | 30 | 40 | Total | Gms. suc. acid/ gals. sol. | Lbs. rock/ lb. sol. | Gms. suc. acid/ lb. rock | | | |
| ---- | 2 | 1½ | 1½ | 5 | 41.7 | 6.67 | 0.75 | 10.4 | 31½ | 6.24 |
| ---- | 2 | 1½ | 1½ | 5 | 61.1 | 6.67 | 1.1 | 10.4 | 30½ | 6.15 |
| ---- | 3 | 1½ | 1 | 5½ | 61.1 | 6.67 | 1.1 | 10.4 | 29½ | 6.20 |
| ---- | 2½ | 1½ | 1 | 5 | 61.1 | 6.67 | 1.1 | 10.4 | 30 | 6.22 |
| ---- | 2½ | 1½ | 1 | 5 | 61.1 | 6.67 | 1.1 | 6.2 | 31 | 6.42 |
| ---- | 3½ | --- | 1¼ | 4⅝ | 61.1 | 6.67 | 1.1 | 6.2 | 30½ | 6.22 |
| ---- | 3½ | --- | 1½ | 5 | 83.3 | 6.67 | 1.5 | 6.2 | 31 | 6.18 |
| ---- | 3 | 2 | --- | 5 | 83.3 | 6.67 | 1.5 | 6.2 | 29½ | 6.37 |
| ---- | 3 | 2 | ½ | 5½ | 61.1 | 6.67 | 1.1 | 6.2 | 29½ | 6.23 |
| 3 | --- | 2 | ½ | 5½ | 61.1 | 6.67 | 1.1 | 6.2 | 29½ | 6.20 |

Note.—The succinic acid was neutralized with KOH to form potassium succinate.

The calcining process disclosed in Patent No. 2,907,667, in which gypsum particles are coated with a crystal-habit-modifier, requires a substantially longer processing time than either the solution or percolation method. The normal calcining time at a pressure of 20 p.s.i.g. for gypsum rock having a particle size of about 1½" to ½" is 16 hours after soaking in a solution of a crystal-habit-modifier for 5 minutes. This is to be compared with the In the following table a number of calcinations of gypsum using the "coating" method are tabulated. In many instances it will be noted that the normal calcination time of 16 hours has been reduced more than 50% while low consistency gypsum is still produced.

TABLE V

*Calcination of Gypsum Rock Coated With a Solution of Potassium Succinate*

| Rock size | Hours at press. (p.s.i.g.) | | | | | | Conc. of suc. acid, percent | Consist., cc. | Combined H₂O, percent |
|---|---|---|---|---|---|---|---|---|---|
| | 17 | 18 | 20 | 30 | 40 | Total | | | |
| 1½"–½" | --- | --- | 2 | 2 | 1 | 7 | 17.5 | 30½ | 6.28 |
| 1½"–½" | 2 | --- | 2 | 2 | 1 | 7 | 17.5 | 31 | 6.18 |
| 1½"–½" | 3 | --- | 2 | 1 | 1 | 7 | 17.5 | 31 | 6.36 |
| 0–½" | --- | 2 | 2 | 2 | 1 | 7 | 17.5 | 33 | 5.74 |
| ½"–¼" | --- | 2 | 2 | 2 | 1 | 7 | 17.5 | 31 | 5.62 |
| 3 M–20 M | --- | 2 | 2 | 2 | 1 | 7 | 17.5 | 31½ | 5.83 |
| 3 M–20 M | --- | 2 | 2 | 2 | 1 | 7 | 17.5 | 30 | 5.34 |
| ½"–10 M | --- | --- | 2 | 2 | 2 | 6 | 12.5 | 31½ | 6.14 |
| ½"–10 M | --- | --- | 2 | 2 | 2 | 6 | 15.0 | 31½ | 6.11 |
| ½"–10 M | --- | 2 | 2 | 2 | 1 | 7 | 12.5 | 31½ | 6.23 |
| ½"–10 M | --- | 2 | 2 | 2 | 1 | 7 | 15 | 32 | 5.92 |
| 1½"–½" | --- | 2 | 2 | 2 | 1 | 7 | 17.5 | 31 | 6.09 |
| 1½"–½" | --- | --- | 3 | 2 | ½ | 5½ | 6+.05% Nac. Z | 33½ | 6.24 |
| 1½"–½" | --- | --- | 3 | 2 | 1 | 6 | 10+.05% Nac. Z | 30½ | 6.14 |
| 1½"–½" | --- | 2 | 2 | 2 | ½ | 6½ | 12+.05% Nac. Z | 30½ | 6.18 |
| 1½"–½" | --- | 5 | --- | 2 | ¾ | 7¾ | 10+.05% Nac. Z | 30½ | 6.13 |
| 1½"–¾" | --- | --- | 4 | 2-25 1-30 | --- | 7 | 10+.05% Nac. Z | 32 | 6.53 |
| 1½"–½" | --- | --- | --- | 2 | --- | 7 | 10+.05% Nac. Z | 32½ | 6.47 |
| 1½"–½" | --- | 5 | --- | 3-25 | --- | 9 | 10+.05% Nac. Z | 30 | 6.18 |
| 1½"–½" | --- | 6 | --- | 3-25 | --- | 8 | 10+.05% Nac. Z | 30½ | 6.24 |
| 1½"–½" | --- | 5 | --- | 2-25 | --- | 6 | 10+.05% Nac. Z | 31½ | 6.17 |
| 1½"–½" | --- | 4 | --- | 2-25 | --- | 9 | 10+.05% Nac. Z | 31 | 6.20 |
| 1½"–½" | --- | 5 | 2 | 2-25 | --- | 9 | 10+.05% Nac. Z | 31½ | 6.19 |
| 1½"–½" | --- | 7 | --- | 2-25 | --- | 9 | 10+.05% Nac. Z | 30½ | 6.20 |
| 1½"–½" | 5 | 2-19 | --- | 2-25 | --- | 9 | 10+.05% Nac. Z | 30½ | 6.20 |

Note.—The succinic acid was neutralized with potassium hydroxide to form potassium succinate. Nac. Z—Nacconol Z wetting agent; other wetting agents are suitable such as are set forth in Patent No. 2,907,667.

As previously mentioned the basic concept of this invention is adaptable not only to calcination procedures employing crystal-habit-modifiers, but also to the steam calcination procedure of the Randel and Dailey U.S. Patent No. 1,901,051 as indicated in the subjoined Table VI. The normal calcination time for the Randel and Dailey method is approximately 5 hours at a constant pressure of about 17 p.s.i.g.

TABLE VI

*Calcination in Steam Without Crystal-Habit-Modifiers but With Increase in Pressure*

| Rock Size | Hours at pressure (p.s.i.g.) | | | | | Consist., cc. | Combined H²O, percent |
|---|---|---|---|---|---|---|---|
| | 17 | 20 | 25 | 30 | Total | | |
| 1½″–½″ | 3½ | | | 1 | 4½ | 42 | 5.93 |
| 1½″–½″ | 3 | | | 1 | 4 | 42 | 5.88 |
| 1½″–¼″ | 2½ | | | 1 | 3½ | 42 | 5.80 |
| 1½″–⅓″ | 2½ | | | 1 | 3½ | 42 | 5.82 |
| 1½″–½″ | 2 | | | 1 | 3 | 42 | 5.83 |
| 1½″–⅓″ | 1½ | | | 1 | 2½ | 45 | 5.87 |
| 1½″–⅓″ | 1¾ | | | ¾ | 2½ | 43½ | 6.06 |
| 1½″–⅓″ | 2 | | | ¾ | 2¾ | 43 | 5.98 |
| 1½″–⅙″ | 1½ | ½ | | ½ | 2½ | 44½ | 5.89 |
| 1½″–⅙″ | 1½ | | | ¾ | 2¼ | 43 | 5.86 |
| 1½″–⅓″ | 2 | | | ½ | 2½ | 43 | 6.00 |
| 1½″–⅓″ | 2½ | | | ½ | 3 | 43 | 6.04 |
| 1½″–⅓″ | 2 | | | ½ | 2½ | 44 | 6.06 |
| 1½″–⅓″ | 2 | | | ½ | 2½ | 43 | 5.83 |
| 1½″–⅛″ | | 2½ | | | 2½ | 44 | 6.40 |
| 1½″–⅛″ | | | 1½ | | 1½ | 45½ | 5.67 |
| 1½″–½″ | | | | ¹70 | ¹70 | 47 | 5.65 |

¹ Minutes.

The foregoing tabulated calcination data have clearly shown that the calcination time may be materially reduced by properly regulating the calcination pressures. An initial low saturated steam pressure of about 15 to 25 p.s.i.g. (250 to 267° F.) must be used to initiate this alpha gypsum formation. A higher saturated steam pressure may then be utilized to complete the formation of low consistency calcium sulfate hemihydrate.

The particular crystal-habit-modifier solutions which may be employed in the various calcination procedures above described do not comprise any portion of this invention. It is well known that a large number of these crystal-habit-modifiers may be employed to assist in the formation of a desired cubical calcium sulfate hemihydrate crystal. The concepts of this invention are applicable to all those calcination processes employing a steam atmosphere for calcining purposes. These various processes may or may not employ a crystal-habit-modifier.

In following this invention, it is to be understood that whenever different rock, different types and concentrations of crystal-habit-modifiers are used or any other changes are made in the calcination that runs should be made to determine the length of time required at the lower or initial pressure to effect complete calcination. As mentioned earlier, the time so established is to be considered 100% and used as a datum for obtaining length of time by percentage when certain pressure changes are made in the processing conditions as set forth herein. Such datum is known as the normal calcination time and will be so designated throughout the forthcoming claims.

In those processes employing crystal-habit-modifiers the modifier need only be present during the initial low-pressure calcination portion of the process. Following the initiation of the alpha gypsum growth, the modifiers may be removed and the calcination completed in a saturated steam atmosphere. Although pressures have been set forth in the foregoing disclosure, it should be noted that the temperature attendant the pressure is the physical condition which enables the desired reaction to be effected. The foregoing pressures were of saturated steam to assure a definite temperature condition.

Accordingly, the specific physical means for imparting the desired temperatures in the process above disclosed is immaterial.

In view of the many modifications which may be employed in various processes which still remain within the embodiment of the invention above discussed, this invention is to be limited only by the scope of the appended claims.

I claim:

1. In the calcination of gypsum particles, said particles being selected from the group consisting of gypsum particles, gypsum particles which are coated with a solution of a crystal-habit-modifier, gypsum particles which have a crystal-habit-modifier solution percolated therethrough and gypsum particles which are maintained in a solution of a crystal-habit-modifier the steps comprising subjecting said particles to an initial saturated steam pressure of between 15 and 25 p.s.i.g. until formation of calcium sulfate hemihydrate has been initiated, increasing the steam pressure to a pressure greater than the initial pressure but less than about 60 p.s.i.g. until calcination is completed in less than 50% of the normal calcination time expended in effecting calcination of said treated gypsum particles at said initial saturated steam pressure.

2. In the calcination of gypsum particles in a solution of a crystal-habit-modifier, the steps comprising subjecting said particles to a saturated steam pressure of between about 15 to 25 p.s.i.g. for between about 1 to 10% of the normal calcination time, increasing the pressure to a pressure greater than 25 p.s.i.g. but less than about 60 p.s.i.g. until calcination is completed in less than 50% of the normal calcination time expended in effecting calcination of gypsum particles in said crystal-habit-modifier solution at a saturated steam pressure of between about 15 to 25 p.s.i.g.

3. In the calcination of gypsum particles in a saturated steam atmosphere, the improvement comprising subjecting said particles to a saturated steam pressure of between about 15 to 25 p.s.i.g. until formation of calcium sulfate hemihydrate has been initiated, and then increasing the saturated steam pressure to a pressure in excess of 25 p.s.i.g. but less than about 60 p.s.i.g. until calcination is completed; said calcination being completed in less than 50% of the normal calcination time expended in effecting calcination of gypsum particles in a saturated steam atmosphere at a pressure of between about 15 to 25 p.s.i.g.; said pressure being increased in stepwise increments of between about 3 and 23 p.s.i.g.

4. In the calcination of gypsum particles in a solution of a crystal-habit-modifier, the improvement comprising subjecting said particles to an initial saturated steam pressure of between about 15 and 25 p.s.i.g. until formation of calcium sulfate hemihydrate has been initiated, increasing said pressure in a substantially continuous manner until calcination is completed in less than 50% of the time normally expended in calcining gypsum particles in a crystal-habit-modifier solution at said initial saturated steam pressure; said pressure being increased at an average rate of about .2 to 6 p.s.i.g. per percent of normal calcination time.

5. In the process of producing low-consistency calcined gypsum in a solution of a crystal-habit-modifier, the calcined gypsum having, when gauged with water, a pouring consistency of from about 33 to about 37 cubic centimeters of water per 100 grams of said calcined gypsum, the improvement comprising subjecting gypsum particles of a size within the range of from about ¼ inch in diameter to about 10 mesh to an initial steam pressure of between 18 and 20 p.s.i.g. until formation of calcium sulfate hemihydrate has been initiated, and increasing said steam pressure in a stepwise manner in increments of between 7 and 20 p.s.i.g., said calcination being completed in less than 50% of the time normally expended in calcining gypsum in a solution of a crystal-habit-modifier at said initial pressure.

6. The process of calcination claimed in claim 5 in which the stepwise pressure increases are carried out after removal of said crystal-habit-modifier, following application of said initial pressure.

7. In the process of producing low-consistency calcined gypsum in a steam atmosphere in which a crystal-habit-modifier solution is percolated through gypsum particles, the improvement comprising subjecting said particles to a pressure of between about 15 to 25 p.s.i.g. under saturated steam conditions until formation of calcium sulfate hemihydrate has been initiated, increasing said pressure until the calcination is completed in less than 50% of the time normally expended in calcining gypsum particles when having a crystal-habit-modifier percolated therethrough at a pressure of between about 15 to 25 p.s.i.g. under saturated steam conditions.

8. In the process of producing low-consistency calcined gypsum from gypsum particles coated with a crystal-habit-modifier, the calcined gypsum having, when gauged with water, a pouring consistency of from about 30 to about 34 cubic centimeters per 100 grams of said calcined gypsum, the improvement comprising subjecting particles of a size within the range of from about ½ inch in diameter to about 1½ inches in diameter to an initial steam pressure of between 17 and 20 p.s.i.g. until formation of calcium sulfate hemihydrate has been initiated, and increasing said steam pressure to a pressure greater than said initial pressure but less than about 60 p.s.i.g. until said calcination is completed in less than 50% of the calcination time normally expended in calcining gypsum particles coated with a crystal-habit-modifier at a steam pressure of between 17 and 20 p.s.i.g.

References Cited in the file of this patent

UNITED STATES PATENTS

| | | |
|---|---|---|
| 1,931,240 | Randell et al. | Oct. 17, 1933 |
| 2,460,267 | Haddon | Feb. 1, 1949 |
| 2,907,668 | Nies et al. | Oct. 6, 1959 |
| 2,913,308 | Dailey et al. | Nov. 17, 1959 |

UNITED STATES PATENT OFFICE
CERTIFICATE OF CORRECTION

Patent No. 3,081,152            March 12, 1963

Elmer S. Johnson

It is hereby certified that error appears in the above numbered patent requiring correction and that the said Letters Patent should read as corrected below.

Column 3, lines 36 and 37, for "calcin-time" read -- calcining time --; column 4, line 30, for "in", second occurrence, read -- is --; column 6, second table, under the heading "Combined $H_2O$, percent", last line thereof, for "6.25" read -- 6.26 --; columns 7 and 8, TABLE IV, under the heading "Consist., cc.", fourth line thereof, for "30" read -- 30+ --; column 8, TABLE V, under the heading "Rock size", for "3 M-20 M", second occurrence, read -- -20 M --.

Signed and sealed this 24th day of September 1963.

(SEAL)
Attest:

ERNEST W. SWIDER
Attesting Officer

DAVID L. LADD
Commissioner of Patents